Patented July 6, 1926.

1,591,720

UNITED STATES PATENT OFFICE.

FLOYD J. METZGER, OF NEW YORK, N. Y., ASSIGNOR TO CALIFORNIA CYANIDE COMPANY, INC., OF NEW YORK, N. Y., A CORPORATION OF DELAWARE.

PRODUCTION OF ALKALI METAL CYANIDES.

No Drawing.   Application filed July 15, 1924. Serial No. 726,226.

This invention relates to the fixation of nitrogen, and particularly to the production of alkali metal cyanides by subjecting a mixture of carbon with alkali metal compounds to the action of nitrogen in the presence of a catalyst such as iron. I have described such a process in my United States Letters Patent No. 1,322,195 including the use of alkali metal compounds, but without reference to mixtures of such compounds designed and intended to improve the yield from the process. The alkali metal compound is mixed with carbon and heated to a relatively high temperature, that is, from 950 to 1100° C. Sodium carbonate is preferred inasmuch as it is readily available, suitable for use in the process, and furnishes sodium cyanide, a product of wide commercial utility.

In carrying out the process with sodium carbonate, the temperature employed is sufficiently high to partially melt the alkali metal compound which becomes more or less plastic. It does not melt sufficiently to thoroughly impregnate the carbon. The contact obtained between the carbon and the alkali metal compound is, therefore, limited.

The reaction depends upon intimate contact between the carbon, the alkali metal compound and the nitrogen, and thorough impregnation of the carbon with the alkali metal compound ensures this result. Impregnation provides another advantage inasmuch as the mass loses its plastic character and does not agglomerate. It flows through the furnace more uniformly and can be removed therefrom with less difficulty.

The desired impregnation is best accomplished by employing a mixture of alkali metal compounds having a lower melting point than either the sodium or potassium compounds alone. I am enabled, in fact, to obtain impregnation in this manner at a lower temperature than thas been necessary heretofore for the proper operation of the process. Mixtures of sodium and potassium carbonate, for example, are known to have a lower melting point than either of these compounds alone. The hydroxides of the alkali metals can be used similarly with the same effect. By employing a mixture of approximately 56.5 per cent of potassium carbonate and 43.5 per cent of sodium carbonate I attain the lowest melting point. It is not essential, however, that these exact proportions be used. Preferably from forty to sixty per cent of sodium carbonate with a corresponding proportion of potassium carbonate should be employed, but it is possible to obtain the result desired with from thirty-five to sixty-five per cent of sodium carbonate and a corresponding proportion of potassium carbonate. If the hydroxides are used the same proportions would be used.

The mixtures of alkali metal compounds specified have the property of becoming substantially fluid at the temperatures employed in carrying out the process, whereas at similar and even higher temperatures sodium or potassium compounds alone do not pass beyond the plastic stage. The fluidity of the melted mixtures permits the absorption thereof by the carbon so that the furnace charge is in a granular and non-agglomerated condition. The alkali metal compounds are distributed thoroughly throughout the carbon so that the activity of the reaction is materially increased. As a result thereof the yield of alkali metal cyanide in the furnace product is increased from thirty to fifty per cent and the product is handled more easily because it flows from the furnace in a substantially dry granular condition.

In carrying out the process in accordance with the invention, I prepare mixtures of potassium and sodium compounds, such as the carbonates or hydroxides, in the proportions heretofore mentioned and combine approximately fifty per cent of the mixture with fifty per cent of carbon, preferably in a finely divided condition. Approximately two per cent of iron, preferably in the form of iron oxide, is added to and thoroughly incorporated with the mixture, which is then introduced in a retort or furnace. A rotary, cylindrical externally heated retort is best adapted for the treatment of the material. In this retort the material is subjected to a temperature of approximately 1000° C. and is maintained at that temperature while nitrogen or nitrogenous gases are introduced and permitted to pass through the mixture. The retort should be completely filled with the mixture to prevent channelling and to ensure thorough contact between the nitrogenous gas and the furnace charge. The rotation of the retort causes the particles therein to move relatively to each other and to the stream of gas so that all of the material is subjected to the action of the nitrogen. A charge remains in the furnace from eighteen to twenty-four hours and is then withdrawn in a granular condition. Preferably, portions of the charge are withdrawn at intervals. It contains thirty per cent or more of alkali metal cyanide, the balance being unconverted carbon, alkali metal compounds and iron.

To separate the hydrocyanic acid from the cyanide the furnace charge is placed in a suitable converter and there subjected to the action of carbon dioxide. The accompanying reaction releases the hydrocyanic acid which passes off as a vapor and can be condensed by the application of refrigeration, leaving the carbon dioxide which has not been absorbed by the furnace charge to be returned for use in the treatment of additional material. The alkali metal compounds and carbon remaining after the removal of the hydrocyanic acid therefrom are returned to the retort with suitable additions to make up the charge. When the returned material has accumulated an excess of ash, it is discarded and replaced with fresh material.

The particular advantage of the invention is the increased yield which arises from the closer contact maintained between the carbon and alkali metal compounds. The result is accomplished by utilizing the property of mixtures of alkali metal compounds melting at comparatively low temperatures and becoming sufficiently fluid so that thorough absorption by the carbon is possible.

Various changes may be made in the details of the process, particularly in the proportions of the alkali metal compounds as specified herein, without departing from the invention or sacrificing any of the advantages thereof.

I claim:

1. The step in the process of producing alkali metal cyanides, which comprises impregnating carbon with alkali metal compounds by mixing a combination of such compounds having a lower melting point than one of such compounds alone with the carbon and subjecting the mixture to a sufficiently high temperature to ensure fluidity of the alkali metal compounds.

2. The step in the process of producing alkali metal cyanides, which comprises impregnating carbon with alkali metal compounds by mixing a combination of sodium and potassium compounds having a lower melting point than either of them alone with the carbon and subjecting the mixture to a sufficiently high temperature to ensure fluidity of the sodium and potassium compounds.

3. The step in the process of producing alkali metal cyanides, which comprises impregnating carbon with alkali metal compounds by mixing from 35 to 65 per cent of sodium carbonate and 65 to 35 per cent of potassium carbonate with the carbon and subjecting the mixture to a sufficiently high temperature to ensure fluidity of the sodium and potassium carbonates.

4. The step in the process of producing alkali metal cyanides, which comprises impregnating carbon with alkali metal compounds by mixing approximately 43.5 per cent of sodium carbonate and 56.5 per cent of potassium carbonate with the carbon and subjecting the mixture to a sufficiently high temperature to ensure fluidity of the sodium and potassium carbonates.

5. The process of producing alkali metal cyanides, which comprises mixing compounds of sodium and potassium with carbon and heating the mixture to a sufficiently high temperature to ensure fluidity of the sodium and potassium compound, in the presence of nitrogen.

6. The process of producing alkali metal cyanides, which comprises mixing compounds from 35 to 65 per cent of sodium carbonate and 65 to 35 per cent of potassium carbonate with carbon and subjecting the mixture to a sufficiently high temperature to ensure fluidity of the sodium and potassium carbonates, in the presence of nitrogen.

7. The process of producing alkali metal cyanides, which comprises mixing approximately 43.5 per cent of sodium carbonate and 56.5 per cent of potassium carbonate with carbon and subjecting the mixture to a sufficiently high temperature to ensure fluidity of the sodium and potassium carbonates, in the presence of nitrogen.

In testimony whereof I affix my signature.

FLOYD J. METZGER.